(12) United States Patent
Jankiewicz

(10) Patent No.: US 9,579,594 B2
(45) Date of Patent: Feb. 28, 2017

(54) EXTERNAL FILTER SEAL

(71) Applicant: AQUAEL JANUSZ JANKIEWICZ Sp. z.o.o., Warsaw (PL)

(72) Inventor: Janusz Jankiewicz, Warsaw (PL)

(73) Assignee: Aquael Janusz Jankiewicz SP. Z O.O., Warsaw (PL)

( * ) Notice: Subject to any disclaimer, the term of this patent is extended or adjusted under 35 U.S.C. 154(b) by 0 days.

(21) Appl. No.: 14/990,555

(22) Filed: Jan. 7, 2016

(65) Prior Publication Data
US 2016/0136551 A1   May 19, 2016

Related U.S. Application Data

(63) Continuation of application No. PCT/PL2014/000075, filed on Jul. 10, 2014.

(30) Foreign Application Priority Data

Jul. 10, 2013 (PL) .......................... 404634

(51) Int. Cl.
*B01D 35/30* (2006.01)
*B01D 35/147* (2006.01)
*C02F 103/20* (2006.01)

(52) U.S. Cl.
CPC .......... *B01D 35/30* (2013.01); *B01D 35/147* (2013.01); *B01D 2201/303* (2013.01); *B01D 2201/342* (2013.01); *B01D 2201/347* (2013.01); *B01D 2201/4015* (2013.01); *B01D 2201/4076* (2013.01); *C02F 2103/20* (2013.01);

(Continued)

(58) Field of Classification Search
None
See application file for complete search history.

(56) References Cited

U.S. PATENT DOCUMENTS

| | | | |
|---|---|---|---|
| 6,793,818 B1 * | 9/2004 | Entringer | B01D 29/96 210/232 |
| 2006/0070942 A1 * | 4/2006 | An | B01D 35/30 210/433.1 |

(Continued)

OTHER PUBLICATIONS

International Search Report, mailed Nov. 6, 2014, with Written Opinion for corresponding International Application PCT/PL2014/000075.

*Primary Examiner* — Benjamin Kurtz
(74) *Attorney, Agent, or Firm* — Myers Wolin, LLC

(57) ABSTRACT

A seal comprises a lid that is rotary-mounted to a filter container base and has a body with at least two stub pipes and an internal part attached to the body in which are formed circulation ducts positioned as an extension of the stub pipes in opened position, and at least one bypass duct connecting the stub pipes in closed position. The internal part is attached to the body using a rotary bayonet mount by rotating to closed position in which the stub pipes are connected by the bypass duct, and the body together with the attached internal part are attached to the base using a rotate-and-lock bayonet mount. In closed position the internal part is attached to the base in a stationary manner using a longitudinal head joint formed on the joined elements, and the changing to opened position occurs by rotating the body in the rotate-and-lock bayonet mount.

10 Claims, 6 Drawing Sheets

(52) U.S. Cl.
CPC .. *C02F 2201/004* (2013.01); *C02F 2201/006* (2013.01); *C02F 2301/043* (2013.01)

(56) References Cited

U.S. PATENT DOCUMENTS

| | | | |
|---|---|---|---|
| 2008/0000820 A1* | 1/2008 | Mitchell | B01D 35/147 210/141 |
| 2010/0243581 A1 | 9/2010 | Williams | |
| 2012/0228206 A1 | 9/2012 | Kim | |

* cited by examiner

EXTERNAL FILTER SEAL

CROSS REFERENCE TO RELATED APPLICATIONS

This is a continuation under 35 U.S.C. §120 of International Application PCT/PL2014/000075, filed Jul. 10, 2014, and claims priority under 35 U.S.C. §119 to PL Application PL404634, filed Jul. 10, 2013, the contents of each being incorporated herein by reference.

FIELD OF THE INVENTION

The subject matter of the invention is an external filter seal, designed for filters used for purification of water in fish aquariums, ponds, pools, and other water basins, provided with a bypass function realized in closed position by a water bypass duct connected with stub pipes executed in the filter lid.

BACKGROUND

A water filter consisting of a filtering cartridge container and a nut-shaped lid with internal thread is known from patent application PL392024. A socket with circulation holes is made in the lid, with an embedded rotary divider valve with bypass function realized by a bypass duct. The divider valve consists of a fixed lower part and a rotary-mounted upper part in which two stub pipes are formed. The lower part has two vertical circulation ducts which, in opened position, connect the stub pipes with the circulation holes. Moreover, a bypass duct is formed in the lower part, which connects the stub pipes after rotating the valve to a closed position. In this position, water flow occurs through the bypass duct, and the valve may be disconnected from the lid. An inconvenience of this valve is its structure consisting of three parts, which makes it difficult to seal the valve and to disconnect it quickly from the lid. Moreover, in order to replace the cartridge it is also necessary to unscrew the lid from the filtering cartridge container.

The purpose of the invention is to eliminate these flaws.

SUMMARY

An external filter seal, consisting of a lid that is rotary-mounted to the filter container base and has a body with at least two stub pipes and an internal part attached to the body. Formed in the internal part are circulation ducts positioned as an extension of the stub pipes in opened position, and at least one bypass duct connecting the stub pipes in closed position. According to the invention, it is characterized in that the internal part is attached to the body using a rotary bayonet mount by rotating to closed position in which the stub pipes are connected by the bypass duct, and the body together with the attached internal part is attached to the base using a rotate-and-lock bayonet mount, where in closed position the internal part is attached to the base in a stationary manner using a longitudinal head joint formed on the joined elements, while the change to the opened position occurs by rotating the body in the rotate-and-lock bayonet mount.

Preferably, the longitudinal head joint is created by at least one lug formed on the perimeter of the internal part and a matching socket formed on the rim of the base.

Preferably as well, the longitudinal head joint constitutes a multi-lug joint created by lugs formed on the perimeter of the internal part and matching sockets formed on the rim of the base.

In the preferred execution of the multi-lug joint, at least one lug and the matching socket have a shape that is different from other elements of the joint, which ensures repeatability of position of the joined elements.

Preferably, the rotary bayonet mount is created by upper locking lugs formed inside the body and a locking flange formed on the perimeter of the internal part, where mounting recesses for the upper locking lugs are executed in the locking flange.

In the preferred execution of the rotary bayonet mount, at least one upper locking lug and the corresponding mounting recess have a perimeter length that is different from other elements of the rotary bayonet mount, which ensures repeatability of position of the joined elements.

Preferably, the rotate-and-lock bayonet mount is created by lower locking lugs formed inside the body, and guiding recesses formed on the perimeter of the base for inserting the lower locking lugs, where the guiding recesses are terminated with perimeter guiding grooves which couple with the lower locking lugs after rotating the body in the rotate-and-lock bayonet mount.

In the preferred execution of the rotate-and-lock bayonet mount, the perimeter guiding grooves are terminated with an abutment limiting the rotation of the lower locking lugs, while at the height of the perimeter guiding grooves the guiding recesses have a skew sliding edge slanting towards the perimeter guiding groove, making it easier to pull out the lower locking lug.

Preferably, the perimeter of the internal part has an abutment flange of diameter greater than the internal diameter of the base, and the said flange has mounting notches for the lower locking lugs formed inside the body.

Preferably, a ring gasket surrounding the holes of the stub pipes and the holes of the circulation ducts is embedded between the body and the internal part, and a perimeter gasket is embedded between the internal part and the internal surface of the base.

Preferably as well, at least one fragment of a gear is formed on the perimeter of the base, below the perimeter guiding groove, and a knob with a toothed wheel mating with the gear is rotary-mounted to the body.

The seal according to the invention has a compact and simple structure. The applied bayonet mounts and the longitudinal head joint make it possible to easily and quickly assemble and disassemble the lid, and to automatically change the position from opened to closed while opening the filter. This makes it easier to replace the filter container or the filtering cartridge.

BRIEF DESCRIPTION OF THE DRAWINGS

The subject matter of the invention is depicted in an example execution in the drawing, where.

DETAILED DESCRIPTION OF THE PREFERRED EMBODIMENTS

Figure 1:
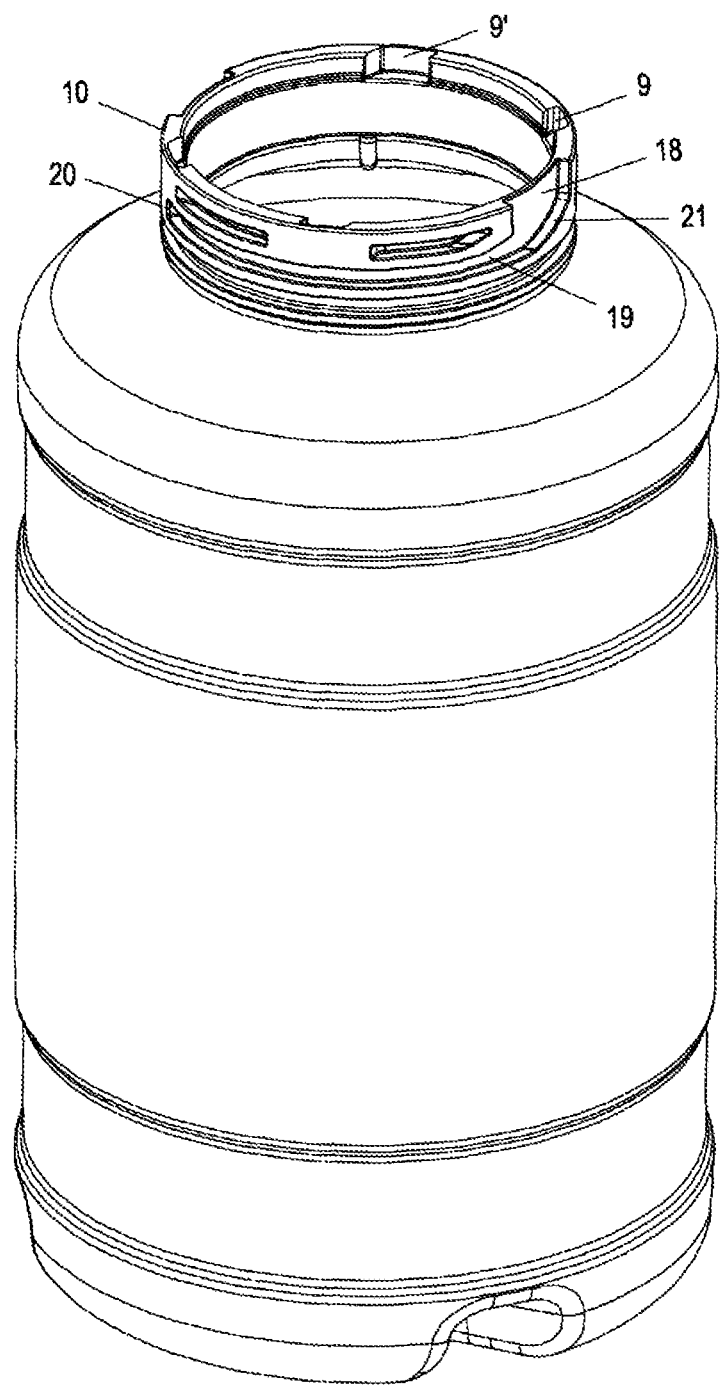
FIG. 1 presents the filter container in perspective view.
Figure 6:
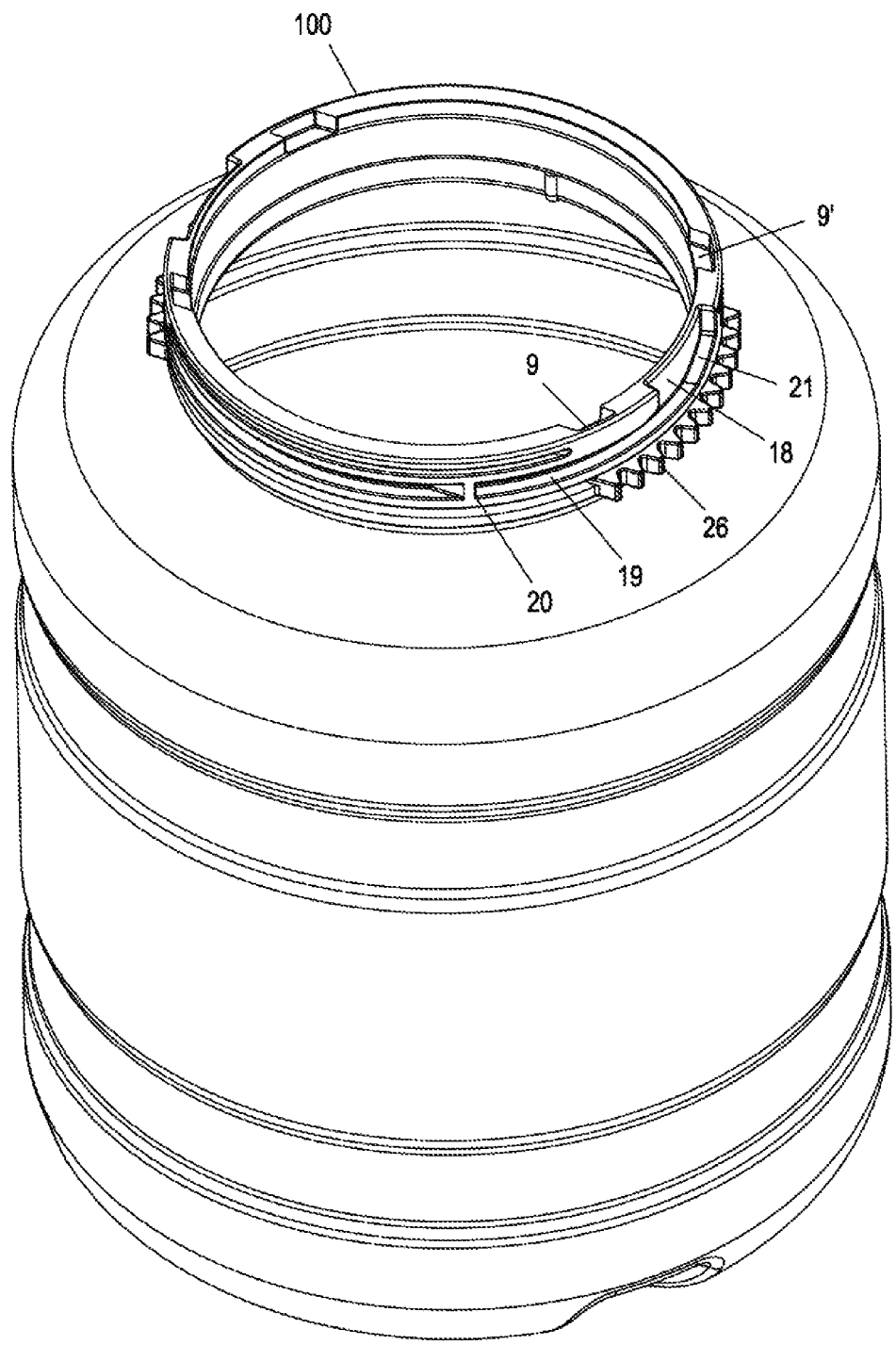
FIG. 6 presents the container of another filter in perspective view.

The external filter seal consists of a lid that is rotary-mounted to the base 10, 100 of the filter container presented as an example in FIG. 1 and FIG. 6. Elements creating the bayonet mounts and the longitudinal head joint, which permit the operation of the seal, are formed in the base 10, 100 and the lid. On the rim of the base 10, 100 there are sockets 9, 9', and formed on its external perimeter are guiding recesses 18 continued as perimeter guiding grooves 19 terminated with an abutment 20. At the height of the perimeter guiding grooves 19 the guiding recesses 18 have a skew sliding edge 21 slanting towards the perimeter guiding groove 19. A technological lug, having no effect on the operation of the seal, is visible inside the container at the foundation of the base 10, 100. The container visible in FIG. 6 has also a fragment of gear 26, formed on the perimeter of the base 100, below the lower edge of the perimeter guiding groove 19.

Figure 2:
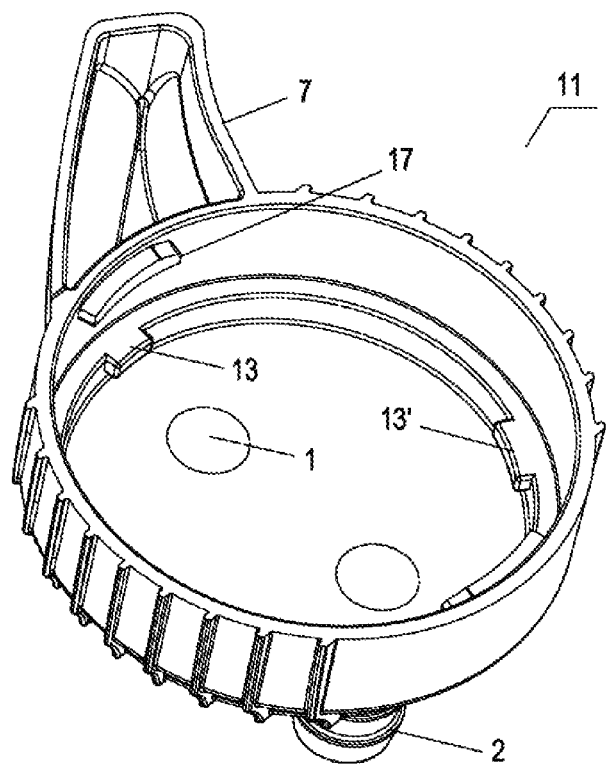
FIG. 2 presents the filter lid body in perspective view.
Figure 3:
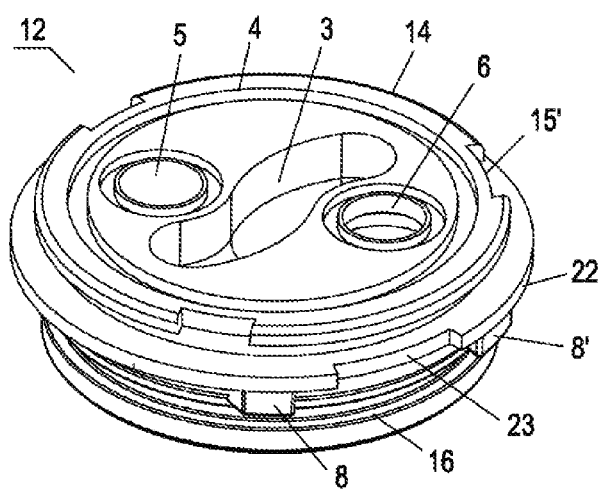
FIG. 3 presents the internal part of the lid in perspective view.

The filter lid consists of a body 11, 110 with at least two stub pipes 1, 2, presented as an example in FIG. 2, 7, and an internal part 12, 120 presented in FIG. 3, 8.

Figure 7:
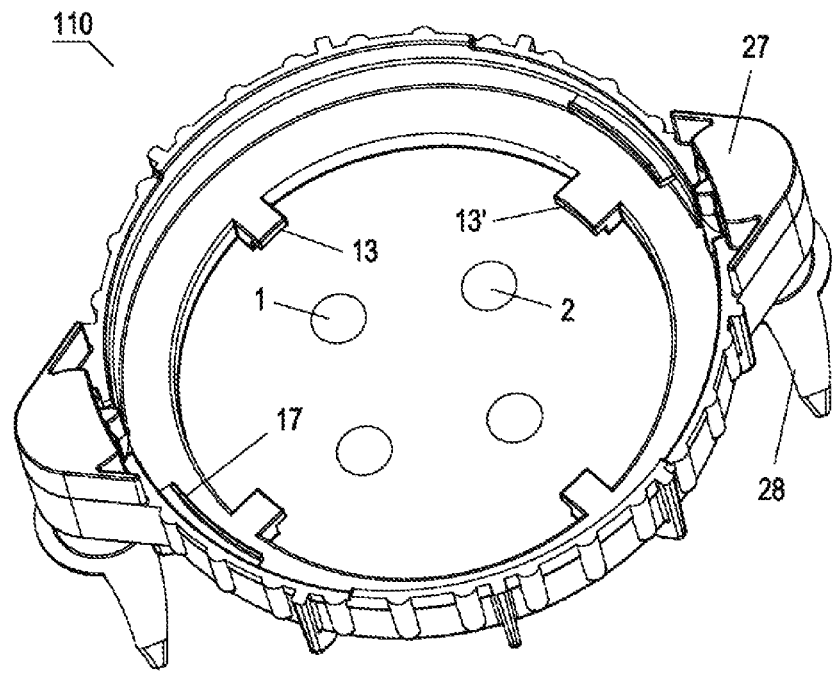
FIG. 7 presents the lid body of another filter in perspective view.
Figure 8:
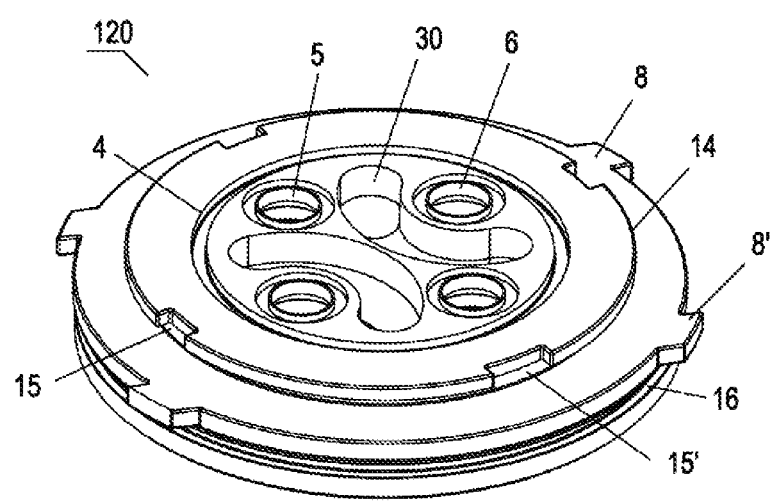
FIG. 8 presents the internal part of the lid of another filter in perspective view.

The body 11, 110 has upper locking lugs 13, 13' and lower locking lugs 17. Moreover, the body 11 from FIG. 2 has a hand grip 7, and formed on the perimeter of the body 110 from FIG. 7 are two holders 27, which have knobs 28 terminated with a toothed wheel.

The internal part 12, 120 has vertical circulation ducts 5, 6 and at least one bypass duct 3, 30. The grooves around the circulation ducts 5, 6, and a ring groove 4, are used for sealing the seal inside the lid. Formed on the perimeter of the internal part 12, 120 are lugs 8, 8' and a locking flange 14 with mounting recesses 15, 15'. Below the lugs 8, 8' runs a perimeter groove 16. Moreover, the internal part 12 from FIG. 3 has on its perimeter an abutment flange 22 of diameter greater than the internal diameter of the base 10, 100, and the said flange has mounting notches 23 for the lower locking lugs 17. Each internal part 12, 120 is rotary-mounted to the body 11, 110 in such a manner that in opened position the circulation ducts 5, 6 are positioned as an extension of the stub pipes 1, 2, and in closed position the stub pipes 1, 2 are connected by at least one bypass duct 3, 30.

Connection of the internal part 12, 120 with the body 11, 110 occurs through the usage of a rotary bayonet mount, by rotating it to closed position, in which the stub pipes 1, 2 are connected by the bypass duct 3, 30. In this position the body 11, 110 together with the attached internal part 12, 120 is attached to the base 10, 100 using a rotate-and-lock bayonet mount, where in closed position the internal part 12, 120 is attached in a stationary manner in the base 10, 100 using a longitudinal head joint formed directly on the contact surfaces of the joined elements. Attaching of the internal part 12, 120 in the base 10, 100 in a stationary manner occurs during the shifting movement of the lid in the rotate-and-lock bayonet mount, and the changing to opened position occurs by rotating the body 11, 110 with a fixed stationary position of the internal part 12, 120 in relation to the container.

The longitudinal head joint consists of at least one lug and recess which, after connecting, serve the function of a connector. Such joint may be created by at least one lug 8 formed on the perimeter of the internal part 12, 120 and the matching socket 9 formed on the rim of the base 10, 100. Selected lugs and recesses may have a varied shape, different from other elements of the joint, in order to ensure repeatability of connection. In the example execution of the external filter seal, the longitudinal head joint constitutes a multi-lug joint created by two pairs of lugs 8, 8' formed on the perimeter of the internal part 12, 120 and the matching sockets 9, 9' formed on the rim of the base 10, 100. The wider lugs 8', visible in FIG. 3, 8, mate with the matching wider sockets 9', visible in FIG. 1, 6, and the remaining lugs 8 mate with the remaining sockets 9. The varied shape of the lugs 8, 8' and the matching sockets 9, 9' ensures strict repeatability of connection of the joined elements of the lid and the base 10, 100 during multiple assembly and disassembly operations.

The rotary bayonet mount is created by the upper locking lugs 13, 13' formed inside the body 11, 110 and the locking flange 14 formed on the perimeter of the internal part 12, 120. Executed in the locking flange 14 are the mounting recesses 15, 15' for the upper locking lugs 13, 13'. The wider upper locking lug 13', visible in FIG. 2, 7, has perimeter length greater than other lugs, likewise the wider mounting recesses 15', visible in FIG. 3, 8. Different perimeter length of these elements of the rotary bayonet mount ensures repeatability of position of the joined elements during multiple assembly and disassembly operations.

The rotate-and-lock bayonet mount is created by the lower locking lugs 17 formed inside the body 11, 110, and the guiding recesses 18 formed on the perimeter of the base 10, 100. The lower locking lugs 17 are guided in the guiding recesses 18 during the shifting movement of the lid. The guiding recesses 18 are terminated with the perimeter guiding grooves 19 which couple with the lower locking lugs 17 after rotating the body 11, 110 in the rotate-and-lock bayonet mount. The perimeter guiding grooves 19 are terminated with the abutment 20, limiting the rotation of the lower locking lugs 17. At the height of the perimeter guiding grooves 19 the guiding recesses 18 have the skew sliding edge 21 slanting towards the perimeter guiding groove 19. This makes it easier to introduce the lower locking lug 17 into the perimeter guiding groove 19, and also makes it easier to pull it out during opening of the lid. Sealing of the seal consists of the ring gasket 24, surrounding the holes of the stub pipes 1, 2 and the holes of the circulation ducts 5, 6, and the perimeter gasket 25. The ring gasket 24 is embedded between the body 11, 110 and the internal part 12, 120 in the ring groove 4 executed in the internal part 12, 120. The perimeter gasket 25 is embedded between the internal part 12, 120 and the internal surface of the base 10, 100 in the perimeter groove 16. Moreover, the sealing includes typical gaskets mounted around every circulation duct 5, 6.

Figure 4:
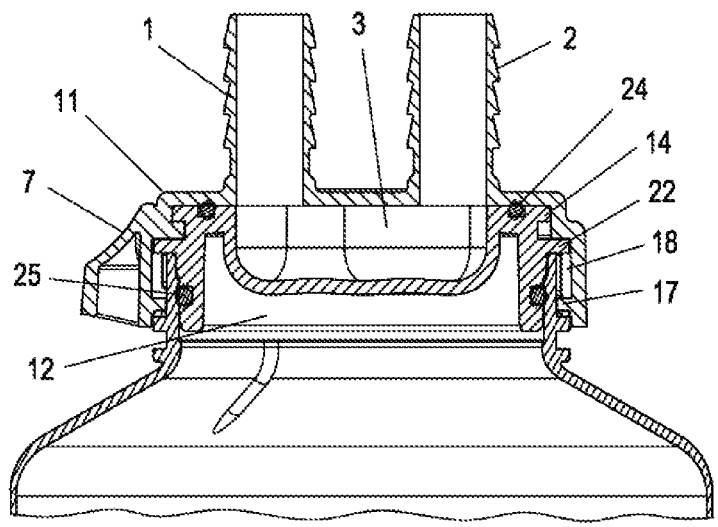
FIG. 4 presents a longitudinal section of the filter seal in closed position.
Figure 5:
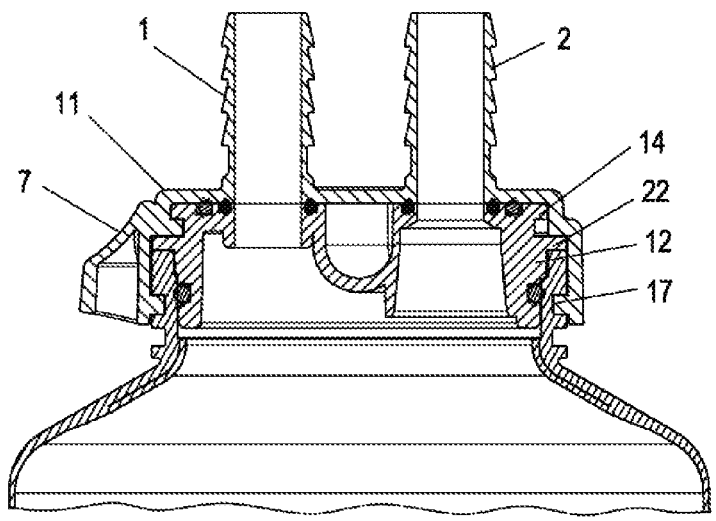
FIG. 5 presents a longitudinal section of the filter seal in opened position.

As presented in FIG. 4, the filter seal in closed position has two stub pipes 1, 2 connected by the bypass duct 3. In this position the lower locking lugs 17 may move in the guiding recesses 18, and the entire lid may be disconnected from the filter container. Attaching of the lid to the base 10 occurs by rotating the body 11 in the rotate-and-lock bayonet mount by angle of approximately 60 degrees to opened position, presented in FIG. 5. In opened position the stub pipes 1, 2 are positioned as an extension of the circulation ducts 5, 6, executed in the internal part 12.

Figure 9:
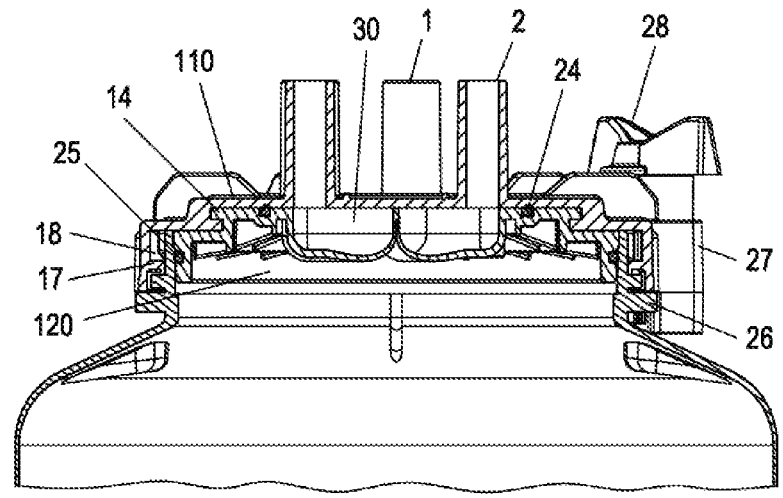
FIG. 9 presents a longitudinal section of the seal of another filter in closed position.
Figure 10:
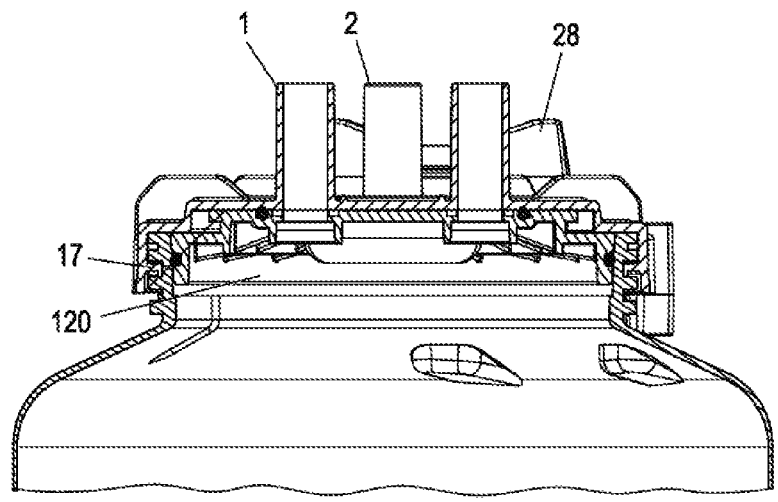
FIG. 10 presents a longitudinal section of the seal of another filter in opened position.

Operation of the seal of another filter, presented in FIG. 9, 10, is analogous. This filter has two pairs of stub pipes 1, 2. In closed position, visible in FIG. 9, both pairs of stub pipes 1, 2 are connected by two bypass ducts 30, and the entire lid may be disconnected from the filter container. Attaching of the lid to the base 100 occurs by rotating the body 110 in the rotate-and-lock bayonet mount by angle of approximately 45 degrees to opened position. In opened position, visible in FIG. 10, all stub pipes 1, 2 are positioned as extensions of the circulation ducts 5, 6, executed in the internal part 120. In this filter execution, rotary-mounted to the body 110 is the knob 28 with a toothed wheel mating with the gear 26 formed on the perimeter of the base 100 below the perimeter guiding groove 19. This makes it easier to disconnect the lid attached to the filter container.

In the solution according to the invention, it is possible to connect two or more stub pipes 1, supplying water to the filter, with one stub pipe 2 carrying water away. For this purpose, one bypass duct connecting the stub pipes 1, 2 in closed position should be applied. This may be achieved, for example, by connecting the bypass ducts 30 with an additional passage formed in the wall that separates them. It is also understood that it is possible to make various changes and/or modifications to the invention presented in specific forms of execution, without departing from the essence of the described solution. For this reason, the presented examples should be regarded in all aspects as illustrative but not limiting.

What is claimed is:

1. An external filter seal comprising a lid that is rotary-mounted to a filter container base wherein the lid has a body with at least two stub pipes and an internal part attached to the body, wherein formed in the internal part are circulation ducts positioned as an extension of the at least two stub pipes in an opened position, at least one bypass duct connecting the at least two stub pipes in a closed position, and sealing members preventing leaks from the ducts installed between the internal parts and the body, wherein the internal part is attached to the body using a rotary bayonet mount by rotating to the closed position in which the at least two stub pipes are connected by the at least one bypass duct, and the body together with the attached internal part is attached to the filter container base using a rotate-and-lock bayonet mount, where in the closed position the internal part is attached to the filter container base in a stationary manner using a longitudinal head joint formed on joined elements, the joined elements comprising the internal part and the filter container base (10, 100), and the changing to opened position occurs by rotating the body in the rotate-and-lock bayonet mount;

wherein on a perimeter of the internal part, there is an abutment flange of diameter greater than an internal diameter of the filter container base, and the abutment flange has mounting notches for lower locking lugs formed inside the body.

2. The seal according to claim 1, wherein the longitudinal head joint is created by at least one lug formed on the perimeter of the internal part and a matching socket formed on a rim of the filter container base.

3. The seal according to claim 1, wherein the longitudinal head joint constitutes a multi-lug joint created by lugs formed on the perimeter of the internal part and matching sockets formed on a rim of the filter container base.

4. The seal according to claim 3, wherein at least one lug and the matching socket have a shape that is different from other elements of the multi-lug joint, which ensures repeatability of position of the joined elements.

5. The seal according to claim 1, wherein the rotary bayonet mount is created by upper locking lugs formed inside the body and a locking flange formed on the perimeter of the internal part, where mounting recesses for the upper locking lugs are executed in the locking flange.

6. The seal according to claim 5, wherein at least one upper locking lug and the corresponding mounting recess have a perimeter length that is different from other elements of the rotary bayonet mount, which ensures repeatability of position of the joined elements.

7. The seal according to claim 1, wherein the rotate-and-lock bayonet mount is created by lower locking lugs formed inside the body, and guiding recesses formed on a perimeter of the filter container base for inserting the lower locking lugs, where the guiding recesses are terminated with perimeter guiding grooves which couple with the lower locking lugs after rotating the body in the rotate-and-lock bayonet mount.

8. The seal according to claim 7, wherein the perimeter guiding grooves are terminated with an abutment limiting the rotation of the lower locking lugs, while at the height of the perimeter guiding grooves the guiding recesses have a skew sliding edge slanting towards the perimeter guiding groove, making it easier to pull out the lower locking lug.

9. The seal according to claim 1, wherein the ring gasket surrounding holes of the stub pipes and holes of the circulation ducts is embedded between the body and the internal part, and a perimeter gasket is embedded between the internal part and an internal surface of the filter container base.

10. The seal according to claim 1, wherein at least one fragment of a gear is formed on the perimeter of the filter container base, below a perimeter guiding groove, and a knob with a toothed wheel mating with the gear is rotary-mounted to the body.

* * * * *